US005776043A

United States Patent [19]

Kato et al.

[11] Patent Number: 5,776,043

[45] Date of Patent: Jul. 7, 1998

[54] RELEASE LIQUID SUPPLY DEVICE AND LIQUID-ABSORBING MATERIAL FOR USE THEREIN

[75] Inventors: Hiroshi Kato; Hiroyasu Kikukawa, both of Okayama, Japan

[73] Assignee: W. L. Gore & Associates, Inc., Newark, Del.

[21] Appl. No.: 604,635

[22] Filed: Feb. 21, 1996

[30] Foreign Application Priority Data

Feb. 22, 1995 [JP] Japan .................................... 7-057973

[51] Int. Cl.[6] .................................................... B23P 15/00

[52] U.S. Cl. ................................................ 492/56; 492/54

[58] Field of Search ........................ 492/54, 56; 428/35.8, 428/35.9, 36.5, 36.8

[56] References Cited

U.S. PATENT DOCUMENTS 5,232,499 8/1993 Kato et al. .............................. 118/244

FOREIGN PATENT DOCUMENTS 60-136782 7/1985 Japan .
60-144778 7/1985 Japan .
62-178992 2/1986 Japan .
61-183679 8/1986 Japan .
5-123623 5/1993 Japan .

*Primary Examiner*—Irene Cuda
*Attorney, Agent, or Firm*—Carol A. Lewis White

[57] ABSTRACT

The present invention is directed to a liquid metering and coating device comprising a perforated hollow member; a liquid-absorbent porous material within said hollow member; at least one shaft component which seals the liquid-absorbent porous material within the hollow member, a means for air passage; a liquid diffusion layer in contact with the perimeter of the perforated hollow member; and a liquid permeation regulating layer in contact with the perimeter of the liquid diffusion layer. The liquid metering and coating device can satisfactorily apply a liquid to a surface with exceptional accuracy, uniformity and durability.

26 Claims, 3 Drawing Sheets

RELEASE LIQUID SUPPLY DEVICE AND LIQUID-ABSORBING MATERIAL FOR USE THEREIN

FIELD OF THE INVENTION

The present invention relates to materials and devices for coating controlled amounts of liquids onto rolls or other surfaces, more particularly to devices for applying release liquids on the surface of rolls in toner fixation assemblies of plain paper copying (PPC) machines.

BACKGROUND OF THE INVENTION

In a PPC copying machine toner images applied to the surface of paper or other recording medium are fixated by application of heat and pressure. In certain PPC copying machines fixation is accomplished by passing the image-bearing recording medium between a hot thermal-fixation roll and a pressure roll. When this type of thermal-fixation device is used the toner material is directly contacted by a roll surface and a portion of the toner adheres to the roll surface. With subsequent rotation of the roll the adhered toner material may be redeposited on the recording medium resulting in undesirable offset images, stains, or smears; or, in severe cases, the recording medium may stick to the adhered toner material on the roll and become wrapped around the roll.

To counter these problems materials having good release properties such as silicone rubber or polytetrafluoroethylene are often used for the roll surfaces. Although improving performance of the thermal fixation devices, use of silicone rubber or polytetrafluoroethylene roll surfaces alone do not eliminate the problems. Another approach used to counter the problems is to include release agents with the toner materials to prevent them from adhering to the roll surface. These oilless toners also improve performance of the thermal-fixation devices but again, particularly in the case of high-speed type copying machines, do not completely eliminate the problems associated with toner pickup and transfer.

Toner pickup by the rolls can be controlled by coating the surface of at least one of the rolls of a thermal fixation device with a liquid release agent, such as a silicone oil. It is important that the release liquid be applied uniformly and in precise quantities to the surface of the roll. Too little liquid, or non-uniform surface coverage, will not prevent the toner from being picked up and redeposited on the roll. On the other hand, excessive quantities of the release liquid may cause silicone rubber roll surfaces to swell and wrinkle, thus producing copies of unacceptable quality.

Devices of various shapes have been proposed in the past to uniformly meter and coat a release liquid on copy machine roll surfaces. Japanese Patent Publication Sho 60-136782 is directed to products obtained by placing a release oil into the hollow portion of a pipe fitted with numerous small holes in its outer peripheral portion and wrapping the outer circumference of the pipe with a heat-resistant felt material such as, for example, NOMEX®. Japanese Utility Model Application Provisional Publication No. Sho 61-104469 is directed to products obtained by wrapping a perforated roll first in a porous material, such as paper, designed to control the amount of oil permeation through the roll, then in heat-resistant felt to obtain uniform diffusion of oil in the axial direction of the roll. Further, Japanese Patent Application Provisional Publication No. Hei 5-123623 is directed to products obtained by forming silicone rubber sponge or the like as an intermediate layer to provide elasticity to the roll, and Japanese Patent Application Publication No. Sho 60-144778 is directed to products obtained using other heat-resistant porous materials instead of the heat-resistant felts described above.

The above-mentioned products, however, involve applying and transferring oil that flows from the perforated roll through the felt or porous material directly to the fixing roll, thus make it difficult to control the oil application. For example, an attempt to reduce the amount of applied oil by reducing the number of holes formed in the hollow pipe yields uneven flow of oil through the pipe and results in irregular oil delivery to the fixing roll. Moreover, reducing the hole diameter results in further problems with oil delivery which tends to impair processing, and thus increase costs. In addition, in order to avoid rapid flow of oil from the perforated roll, high viscosity oil must be used in these products, and, as a general rule, only an oil with a viscosity of 1000 cps or higher can be used.

In order to solve these problems, it is disclosed in Japanese Utility Model Application Provisional Publication No. 61-104469 to wrap a heat-resistant paper or similar heat-resistant material around the surface of a perforated roll to control the oil flow by diffusing it through the paper; however, a disadvantage of this approach is that after long-term non-use of the copiers and other similar equipment in which this delivery system is installed, excessive amounts of oil are delivered upon initial use, and attempts to reduce the amount of oil in the roll to alleviate this problem result in insufficient oil application in the second half of a continuous copying period.

To obviate such problems, Japanese Utility Model Application Provisional Publication No. 61-183679 discloses forming a heat-resistant microporous layer in the form of a membrane on the surface of the heat-resistant felt or porous material (that is, on the surface of the aforementioned roll), thus controlling the amount of oil applied.

Moreover, the inventors have also proposed in Japanese Patent Application Provisional Publication No. 62-178992 to replace the microporous membrane with a composite membrane oil permeation regulating layer which is obtained by filling the voids of the microporous membrane with a mixture of silicone rubber and oil. Such composite membrane is resistant to heat, contamination and mechanical deformation, and allows for precise, uniform, constant delivery of a very small amount of oil for long periods of time.

Although rolls fitted with such oil permeation regulating layers were originally designed to satisfy the required characteristics of such oil application devices, the presence of the regulating layers created new disadvantages. Specifically, the oil blocked the pores of the microporous membrane when the release roll came into contact with the microporous membrane or composite membrane, making it difficult for gas to permeate into the roll in sufficient amounts to displace the oil in the roll and necessitating, for example, a pressure of several tens of kilogram force per square centimeter to ensure oil delivery. As a result, higher pressure was required as the pore diameter of the microporous membrane was reduced in order to permit oil permeation and delivery, making it difficult to permeate gases into the roll without stressing and breaking the membrane in the case of the aforementioned composite membrane.

It should also be noted that pressure is created due to, for example, thermal expansion of oil stored inside the perforated hollow member, moisture absorbed by the oil, and water absorbed by the porous material, and this pressure causes excessive pressure on the oil permeation regulating layer. As a result, increases in the initial amount of oil delivered due to seepage of the oil, and balloon-like swelling and even occasional breakage of the oil permeation regulating layer may occur.

This build-up of pressure in the roll may be overcome by forming a hole for air passage in an end portion of the roll, preferably along the axial line of the roll. However, to prevent the oil from leaking through this hole, the amount of oil stored typically had been no more than half the internal capacity of the roll, and in practice about 30% of the capacity, with a corresponding reduction of service life of the oil delivery roll. Another disadvantage is that because the oil concentrates and accumulates in the lower part of the roll under the action of gravity when a copier or other machine containing such a system is allowed to stand unused for a long time, the weight balance of the roll is disrupted, rotation becomes unsteady, and the oil is applied unevenly during initial operation. Yet another disadvantage is that the oil flows out the hole when the roll is held vertically in such a way that the hole faces down.

It is a purpose of the present invention to provide a device for applying release liquids on surfaces, such as rolls in toner fixation assemblies of PPCs, in a controlled and reliable manner which overcomes the disadvantages described above.

SUMMARY OF THE INVENTION

The present invention provides an improved liquid metering and coating device, and a porous liquid-absorbing material for use therein, which can satisfactorily apply a release liquid to a surface such as, for example, the rolls of a toner fixation assembly of a PPC copying machine or the like with exceptional accuracy, uniformity and durability. Such liquid metering and coating device may comprise a roll, an endless belt or any other configuration which may be satisfactorily utilized to apply liquid to a surface.

In a preferred embodiment of the present invention, the liquid metering and coating device comprises a liquid delivery roll which comprises a perforated hollow member; a liquid-absorbent porous material within said hollow member; at least one shaft component which seals the liquid-absorbent porous material within the hollow member, the shaft component containing a hole for air passage; a liquid diffusion layer in contact with the perimeter of the perforated hollow member; and a liquid permeation regulating layer in contact with the perimeter of the liquid diffusion layer.

BRIEF DESCRIPTION OF THE DRAWINGS

The operation of the present invention should become apparent from the following description when considered in conjunction with the accompanying drawings, in which.

DETAILED DESCRIPTION OF THE INVENTION

The present invention is directed to a liquid metering and coating device in which liquid is stored in a liquid-absorbent material contained in the hollow portion of a perforated hollow member, a liquid diffusion layer is formed on the outer perimeter of the perforated hollow member, a liquid permeation regulating layer is provided on the outermost perimeter, the hollow of the perforated member being sealed by end parts, and wherein a through hole is provided to permit escape of gases during use. The liquid metering and coating device may comprise a roll, an endless belt, or any other configuration satisfactory for applying a liquid to a surface.

Figure 1:
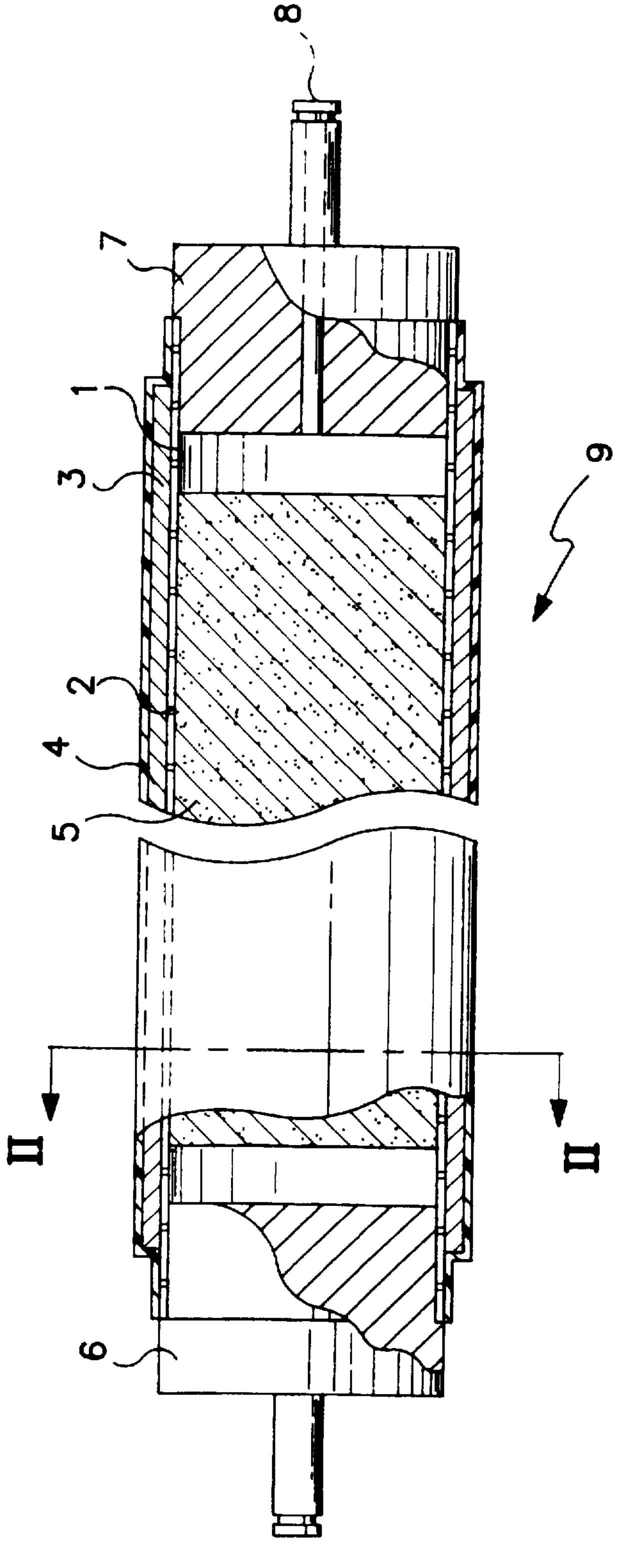
FIG. 1 is a side elevation view of the release liquid supply device of the present invention wherein a portion of the device has been cut away to reveal the internal components.
Figure 2:
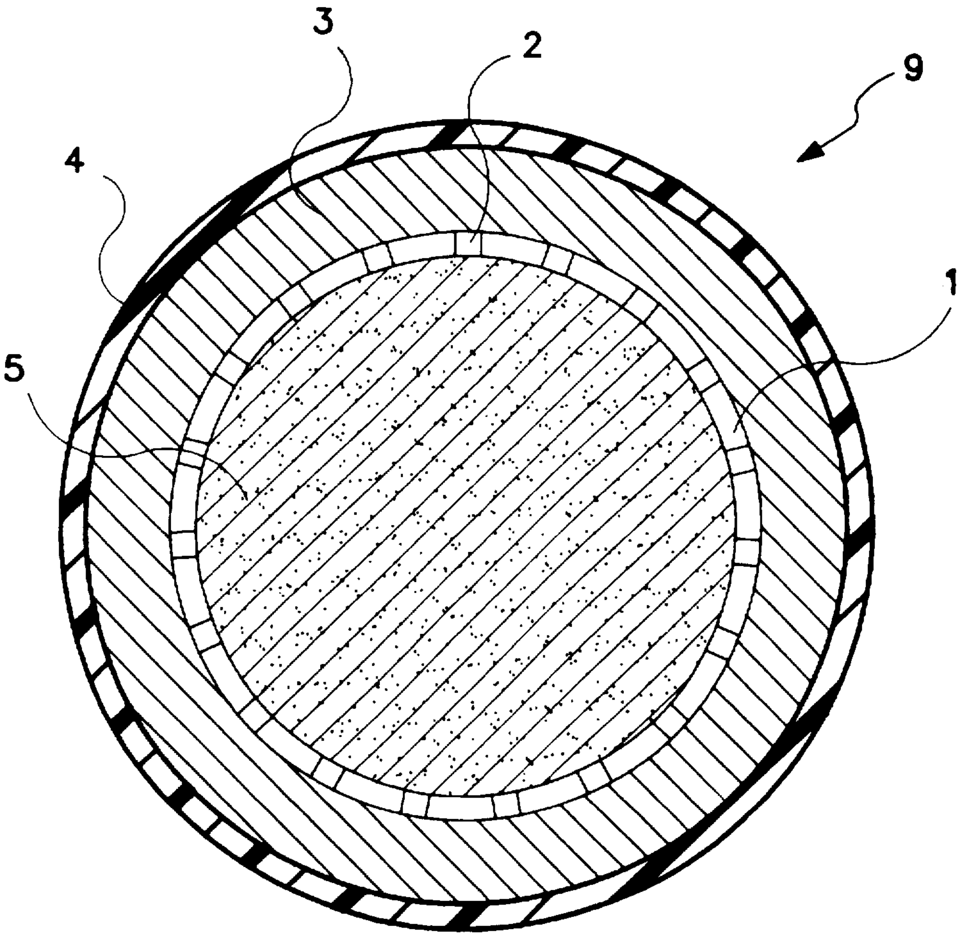
FIG. 2 is a cross sectional view taken along line II—II of FIG. 1.

FIGS. 1 and 2 show a preferred embodiment of the liquid metering and coating device 9 of the present invention, comprising a perforated hollow member 1 having perforations 2, a liquid-absorbent porous material 5 within the hollow portion of member 1, a liquid diffusion layer 3 in contact with the outer perimeter of the hollow member 1, a liquid permeation regulating layer 4 in contact with the perimeter of the liquid diffusion layer 3, end-part sealing shaft members 6 and 7, wherein end-part shaft member 7 includes a hole 8 for outlet of gas from the device 9.

The perforated, hollow member of the present invention may comprise a porous or non-porous material and may be selected from the group consisting of aluminum, iron, stainless steel materials, ceramics, plastics, sintered metals, and the like. If the member is non-porous or of insufficient porosity for the specific use, perforations may be made by any appropriate means such as mechanical processing, etching, or the like. In this regard, a unique feature of the present invention is that there are no required limitations to the size, number or other parameters of the perforations in the hollow member, provided that the perforations allow the liquid to permeate and diffuse through the liquid diffusion layer.

The liquid diffusion layer which is present on the outer perimeter of the perforated, hollow member should have a suitable flexibility and elasticity to ensure good contact with the surface to which the liquid is delivered. In addition, the liquid diffusion layer should exhibit satisfactory liquid diffusion through the layer. Examples of suitable liquid diffusion layer materials include NOMEX® felt, silicone rubber sponge, composite foams obtained by combining silicone rubber products with urethane foams, melamine foams and polyimide foams. The liquid diffusion layer may also optionally be combined, as needed, with fluororesins, silicone rubbers or other elastic materials.

The liquid permeation regulating layer of the present invention may comprise microporous membranes of various plastics and the like. In a preferred embodiment, the liquid permeation regulating layer comprises an expanded PTFE which exhibits desirable heat resistance, strength, release properties, flexibility and ease of pore diameter control. Moreover, in a particularly preferred embodiment wherein the liquid delivery device comprises an oil delivery device for use in PPC copiers, liquid permeation regulating layers comprising composite membranes formed by impregnating the voids of such expanded PTFE with oil mixtures and performing cross-linking are particularly suitable because such membranes facilitate control of oil permeation, yield stable oil permeation characteristics and have desirable durability and release properties.

The porous, liquid-absorbent material of the present invention is capable of retaining a sufficient amount of liquid to permit continuous delivery of the liquid for an extended period of time. In a preferred embodiment, the liquid-absorbent material is capable of retaining liquids up to a height at least equal to the outer diameter of the perforated member of the liquid delivery device. The liquid retention of the material may be determined by a Capillary Retention Test, whereby the liquid-absorbable material is permeated with liquid, then placed in a tray and allowed to sit for a period of time to permit liquid to drain from the material into the tray. Periodic measurements of the distance between the upper surface of the liquid in the tray and the height of the liquid retained in the liquid-absorbent material are taken, and after the level has stabilized, the liquid retention of the material is determined.

The liquid-absorbent material may comprise any material which is impervious to the liquid which is absorbed into the porosity of the material, can withstand the operating temperatures of the assemblies into which the liquid delivery devices are incorporated and has a satisfactory liquid retention.

Examples of suitable liquid-absorbent materials include NOMEX® felt, NOMEX® braid, NOMEX® fiber bundles, glass fiber bundles, carbon fiber bundles, carbon fiber felt, various ceramic sintered porous articles, silicone rubber porous sponge, aramid fiber bundles, polyimide foams, melamine foams, and various other plastic sponges, foams, porous articles, sintered articles and fiber bundles. When the liquid comprises, for example, oils in the case of PPC copier applications, melamine foams are particularly suitable from the standpoint of the oil retention characteristics and elasticity afforded by the porosity level of the foams and by the suitable pore diameter. Without wishing to be bound by theory, it is believed that during operation of the liquid metering and coating device, the oil is transferred out of the porous liquid absorbent material by at least one of concentration gradient between the layers of the liquid delivery device and centrifugal force due to spinning of the device.

Shafts and other components may optionally be used to reinforce the porous, liquid-absorbent materials in order to facilitate their insertion into the hollow member and to improve the shape retention properties of the liquid-absorbent material.

Liquids may be incorporated into the liquid delivery devices of the present invention by any appropriate means which may be contemplated. For example, in one embodiment, the desired amount of liquid may be poured into the perforated hollow member, then the liquid-absorbent material may be inserted into the hollow member. In an alternative embodiment, the liquid-absorbent material may be impregnated with the liquid prior to insertion into the hollow member.

Suitable liquids in the present invention may comprise any liquids which require delivery in uniform, controllable levels and which are compatible with the liquid delivery devices. With regard to release liquids which are to be applied to toner fixation assemblies in PPC copying machines, suitable liquids may include dimethyl silicone oil, fluorine-based oils, fluorinated silicone oils, phenyl silicone oils, and various modified silicone oils. The novel features of the liquid delivery devices permit the use of liquids having a wide range of viscosities, and thus no particular restrictions on liquid viscosity are imposed in the present invention.

Regular use of the liquid delivery devices of the present invention in equipment operation, such as in the case of oil delivery devices for toner fixation assemblies in PPC copiers, results in the consumption of the liquid contained in the liquid-absorbent material. Thus, the present invention further provides for replacement of the exhausted or empty liquid-absorbent material after the liquid has been consumed. Accordingly, in a preferred embodiment, it may be desirable to incorporate a detachable structure in the device which facilitates replacement of an exhausted liquid-absorbent material in the hollow member with a new liquid-absorbent material.

A first advantage of the present invention is the use of a liquid-absorbent material which retains the liquid and prevents undesirable flow of liquid out of the hollow member, thus permitting higher amounts of fluid to be retained in the member. For example, the amount of liquid which may be retained in the hollow member may be up to about 70% of the volume of the hollow member, which is about two or more times the volume of liquid which may be retained in traditional devices, thus extending the life and the efficiency of the device.

A second advantage of the present invention is that due to the liquid-holding capability of the liquid-absorbent material, a majority of the liquid is maintained in the central portion of the hollow member along the axial line of the liquid delivery device so that, even in instances where the device is not in use for extended periods of time, liquid does not collect in the bottom portion of the device, making rotation of the device smooth and preventing uneven coating of liquid.

A third advantage of the present invention is that the use of the liquid-absorbable material prevents liquid from flowing out of the device in situations where the device is positioned vertically with the through hole positioned downward. This feature enables easy handling of the device when it is installed, for example, in a copier or the like.

A fourth advantage of the present invention is the ability to deliver uniform coatings of either high or low viscosity liquids, thus expanding the range of liquids which may be delivered to a surface.

A fifth advantage of the present invention is that delamination and destruction of the liquid-permeation control layer are avoided, thus extending the life of the liquid delivery device beyond that exhibited by traditional liquid delivery devices.

A sixth advantage of the present invention is that upon exhaustion of the liquid which is present in the liquid-absorbable porous material, the material may be replaced with a new liquid-absorbable porous material so that the liquid delivery device can continue in service for an extended period of time.

Other features of the present invention will become apparent based upon the following non-limiting examples.

EXAMPLE 1

A melamine foam (BASOTECT™ manufactured by BASF) was cut into a cylinder having a diameter of about 28 mm and dipped in a dimethyl silicone oil having a viscosity of 100 cps to impregnate the voids of the cylinder with the dimethyl silicone oil. The oil retention of the melamine foam cylinder was then determined using the Capillary Retention Test. Specifically, the impregnated foam was held upright and placed on a tray, and the distance from the upper surface of the oil retained in the melamine cylinder to the surface of the oil accumulated in the tray was measured at 12 hours and at 15 hours from the time that the test was begun. Both measurements were 40 mm; thus, the oil retention of the melamine foam was determined to be 40 mm.

EXAMPLE 2

An oil delivery roll with a structure as shown in FIGS. 1 and 2 was fabricated. Specifically, holes 2 with a diameter of 1 mm were uniformly formed by drilling through the wall at 60° intervals at a longitudinal interval of 1 cm on the outer perimeter of a hollow aluminum pipe 1 having an inside diameter of 24 mm and a wall thickness of 0.8 mm. The surface of the resulting product was spirally wrapped and bonded, using a silicone-based adhesive, with a tape cut from a piece of NOMEX® felt with a thickness of 2 mm and a width of 30 mm, yielding an oil diffusion layer 3. A silicone-based adhesive was applied in a dot pattern to the surface of an expanded polytetrafluoroethylene (PTFE) film (GORE-TEX® membrane, manufactured by Japan Gore-Tex, Inc.) with a thickness of 100 μm, a porosity of 75%, and a mean pore diameter of 0.2 μm, and the surface of the oil diffusion layer was wrapped and bonded in an overlapping manner, such as that used to roll a cigarette, with the expanded PTFE membrane, yielding an oil permeation regulating layer 4.

The same melamine foam cylinder 5 used in Example 1 was subsequently inserted into the hollow portion of the aluminum pipe 1, as shown in the Figures, one end of the pipe 1 was plugged by inserting shaft component 6 which also served as an end seal. About 100 g of dimethly silicone with a viscosity of 100 cps was poured from the other end, and shaft component 7 having a 1.5 mm through hole 8 running along the central axis was then fitted and sealed on the opposite end of the pipe 1, thus yielding the proposed liquid delivery roll 9.

No oil flowed out of the through hole 8 when the roll 9 was held vertically for 5 seconds in such a way that the end with the through hole 8 faced down. Moreover, no oil flowed out of the through hole 8 when the roll 9 was pressed against a heat roll in the fixing unit of a PPC copier and allowed to operate as an oil delivery roll, during which the temperature was raised to about 200° C. Further, no deviation in oil delivery was observed, and a uniform and consistent application state was maintained during use.

COMPARATIVE EXAMPLE 1

A liquid delivery roll was fabricated in the same manner as Example 2, except that no through hole was provided in the end portion. When the roll was installed in a PPC copier and operated on a trial basis in the same manner as in Example 2, the expanded PTFE membrane on the surface of the roll separated from the NOMEX® felt serving as the oil diffusion layer and expanded in a balloon-like manner as the temperature increased during operation.

COMPARATIVE EXAMPLE 2

A liquid delivery roll was manufactured in the same manner as Example 2, except that no cylinder of melamine foam was inserted into the perforated, hollow aluminum pipe. When the roll was held upright in such a way that the through hole faced down, the oil immediately flowed out via the through hole. Moreover, the oil overflowed via the through hole even when the roll was held horizontally, and it was found that the oil accumulated only in the lower half of the roll. After the roll was oriented horizontally and the overflow of oil had stopped, oil continued to be blown out of the roll via the through hole during the trial operation of the roll in a PPC copier.

EXAMPLE 3

A liquid delivery roll was fabricated in the same manner as in Example 2, except that the wrapping and bonding of the expanded PTFE membrane was followed by the impregnation of the expanded PTFE with a mixture containing 70% silicone rubber and 30% silicone oil, and the formation of a composite membrane which served as an oil permeation regulating layer was obtained by heating and cross-linking. The resulting roll was installed in a PPC copier in the same manner as in Example 2, and the amount in which the oil was applied was measured in the course of a continuous paper feeding test.

Figure 3:
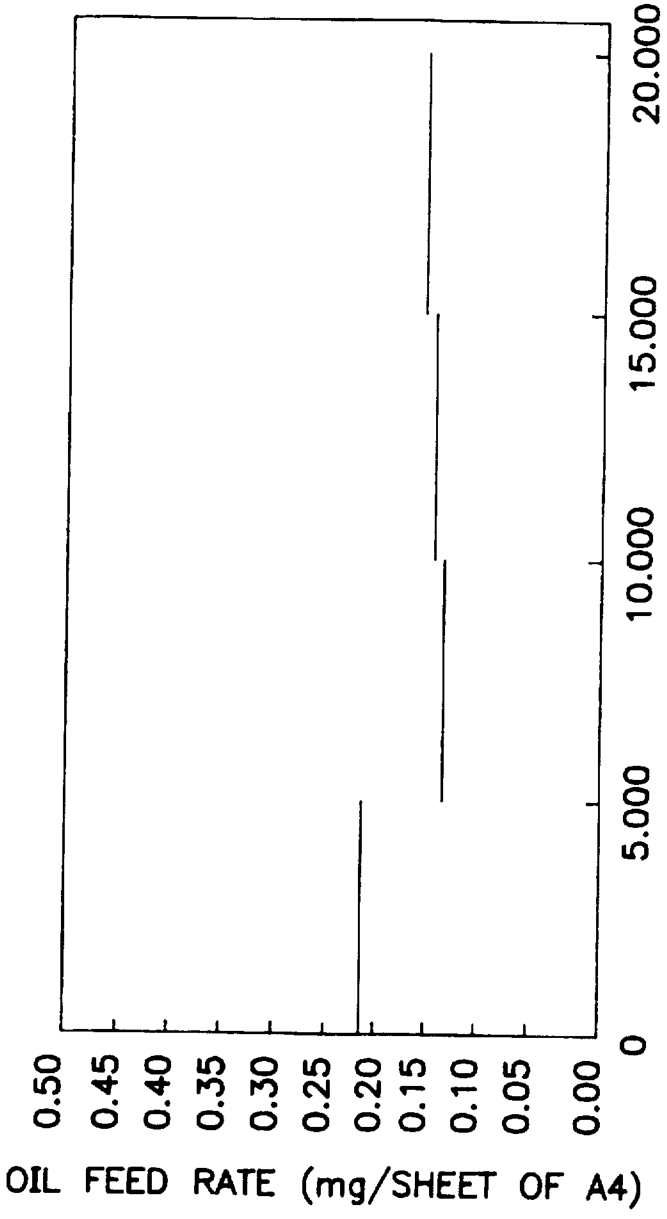
FIG. 3 is a graph showing the relation between oil application and the number of paper sheets fed as described in Example 3.

The results, shown in tabular form in FIG. 3, confirm that consistent oil application is possible. In addition, no oil escape or other undesirable effects were observed during testing. In FIG. 3, the oil feed rate (vertical axis) was calculated on the premise that the consumption is equal to the reduction in the weight of the roll during each interval.

Although the present invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A liquid metering and coating device comprising:

a perforated hollow member;

a liquid-absorbent porous material within the hollow of said perforated hollow member;

a liquid diffusion layer in contact with the outer perimeter of said perforated hollow member;

a liquid permeation regulating layer in contact with the outer perimeter of said liquid diffusion layer;

sealing means for sealing said liquid-absorbent porous material within said perforated hollow member; and at least one hole in said sealing means which permits gas within said liquid metering and coating device to escape during operation.

2. The device of claim 1, wherein said perforated hollow member is in the form of a roll.

3. The device of claim 1, wherein said perforated hollow member comprises a porous material.

4. The device of claim 1, wherein said perforated hollow member comprises a non-porous material.

5. The device of claim 1, wherein said perforated hollow member comprises at least one material selected from the group consisting of aluminum, iron and stainless steel.

6. The device of claim 1, wherein said perforated hollow member comprises at least one material selected from the group consisting of ceramic, plastic and sintered metal.

7. The device of claim 1, wherein said liquid diffusion layer comprises at least one material selected from the group consisting of NOMEX® felt, silicone rubber, composites of silicone rubbers and urethane foams, melamine foams, polyimide foams, and combinations thereof.

8. The device of claim 7, wherein said liquid diffusion layer further comprises at least one fluororesin.

9. The device of claim 1, wherein said liquid permeation regulating layer comprises at least one microporous membrane.

10. The device of claim 9, wherein said liquid permeation regulating layer comprises a plastic.

11. The device of claim 9, wherein said liquid permeation regulating layer comprises expanded polytetrafluoroethylene (PTFE).

12. The device of claim 1, wherein said liquid-absorbent material is capable of retaining liquid up to a height at least equal to the outer diameter of the perforated member.

13. The device of claim 1, wherein said liquid-absorbent porous material comprises at least one material selected from the group consisting of NOMEX® felt, NOMEX® braid, NOMEX® fiber bundles, glass fiber bundles, carbon fiber bundles, carbon fiber felt, porous sintered ceramic, porous silicone rubber sponge, aramid fiber bundles, polyimide foams, melamine foams, and combinations thereof.

14. The device of claim 1, wherein said porous liquid-absorbent material further comprises a reinforcing component.

15. The device of claim 1, wherein said liquid comprises at least one material selected from the group consisting of dimethyl silicone oil, fluorine-based oils, fluorinated silicone oils and phenyl silicone oils.

16. An oil delivery device for use in plain paper copiers comprising a perforated hollow member;

an oil-absorbent porous material within the hollow of said perforated hollow member;

an oil diffusion layer in contact with the outer perimeter of said perforated hollow member;

an oil permeation regulating layer in contact with the outer perimeter of said oil diffusion layer;

sealing means for sealing said oil-absorbent porous material within said perforated hollow member; and at least one hole in said sealing means which permits gas within said oil delivery device to escape during operation.

17. The oil delivery device of claim 16, wherein said device comprises a component of a toner fixation assembly.

18. The oil delivery device of claim 16, wherein said perforated hollow member is in the form of a roll.

19. The oil delivery device of claim 16, wherein said perforated hollow member comprises at least one material selected from the group consisting of aluminum, iron and stainless steel.

20. The oil delivery device of claim 16, wherein said perforated hollow member comprises at least one material selected from the group consisting of ceramic, plastic and sintered metal.

21. The oil delivery device of claim 1, wherein said oil diffusion layer comprises at least one material selected from the group consisting of NOMEX® felt, silicone rubber composites of silicone rubbers and urethane foams, melamine foams, polyimide foams, and combinations thereof.

22. The oil delivery device of claim 16, wherein said oil permeation regulating layer comprises at least one microporous membrane.

23. The oil delivery device of claim 22, wherein said oil permeation regulating layer comprises expanded polytetrafluoroethylene (PTFE).

24. The oil delivery device of claim 16, wherein said oil-absorbent material is capable of retaining oil up to a height at least equal to the outer diameter of the perforated member.

25. The oil delivery device of claim 1, wherein said oil-absorbent porous material comprises at least one material selected from the group consisting of NOMEX® felt, NOMEX® braid, NOMEX® fiber bundles, glass fiber bundles, carbon fiber bundles, carbon fiber felt, porous sintered ceramic, porous silicone rubber sponge, aramid fiber bundles, polyimide foams, melamine foams, and combinations thereof.

26. The oil delivery device of claim 16, wherein said oil comprises at least one material selected from the group consisting of dimethyl silicone oil, fluorine-based oils, fluorinated silicone oils and phenyl silicone oils.

* * * * *